(12) United States Patent
Kotzur et al.

(10) Patent No.: US 9,846,035 B2
(45) Date of Patent: Dec. 19, 2017

(54) GEODETIC SURVEYING DEVICE HAVING AUTOMATIC HIGH-PRECISION TARGET POINT SIGHTING FUNCTIONALITY

(75) Inventors: Norbert Kotzur, Altstätten (CH); Bernhard Metzler, Dornbirn (AT)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 352 days.

(21) Appl. No.: 13/704,347

(22) PCT Filed: Jul. 7, 2011

(86) PCT No.: PCT/EP2011/061498
§ 371 (c)(1),
(2), (4) Date: Dec. 14, 2012

(87) PCT Pub. No.: WO2012/004341
PCT Pub. Date: Jan. 12, 2012

(65) Prior Publication Data
US 2013/0093882 A1    Apr. 18, 2013

(30) Foreign Application Priority Data
Jul. 7, 2010    (EP) ................................ 10168771

(51) Int. Cl.
*G01C 15/02* (2006.01)
*G01C 1/04* (2006.01)
*G01C 15/00* (2006.01)

(52) U.S. Cl.
CPC ............ *G01C 15/02* (2013.01); *G01C 1/04* (2013.01); *G01C 15/00* (2013.01)

(58) Field of Classification Search
CPC .......... G01C 1/04; G01C 15/00; G01C 15/06; G01C 15/02
(Continued)

(56) References Cited

U.S. PATENT DOCUMENTS

| 5,886,340 A | 3/1999 | Suzuki et al. |
| 6,031,606 A * | 2/2000 | Bayer ................ G01C 1/04 |
| | | 250/203.2 |

(Continued)

FOREIGN PATENT DOCUMENTS

| CN | 101101211 A | 1/2008 |
| DE | 197 107 22 A1 | 10/1997 |

(Continued)

OTHER PUBLICATIONS

Machine generated translation of JP2002131054 to Izumitani et al, May 2002.*

(Continued)

*Primary Examiner* — David Harvey
(74) *Attorney, Agent, or Firm* — Maschoff Brennan (57) ABSTRACT

A geodatic surveying device which is equipped with an automatic target point sighting functionality for determining the position of a target point. A reticle pattern that corresponds to the outer shape of the known reticle is stored, wherein a main point of the reticle pattern is predefined as indicating the target point. In order to carry out an automatic target point sighting functionality, the evaluation means are designed such that, after the function start, a camera image of the reticle is automatically recorded, the reticle pattern is aligned with the reticle in the camera image by means of image processing and, depending on a position of the main point in the camera image in the matched state of the reticle pattern, the orientation of the sighting apparatus is changed in a motorized manner such that the optical target axis OA is oriented with high precision at the target point.

17 Claims, 8 Drawing Sheets

(58) Field of Classification Search
USPC .................................. 348/135–137, 140, 169
See application file for complete search history.

(56) References Cited

U.S. PATENT DOCUMENTS

| | | | |
|---|---|---|---|
| 6,072,642 A | 6/2000 | Shirai | |
| 6,433,858 B1 | 8/2002 | Suzuki | |
| 6,504,602 B1 | 1/2003 | Hinderling | |
| 6,643,940 B1* | 11/2003 | Donath | G01C 1/02 33/290 |
| 6,731,329 B1* | 5/2004 | Feist | G01C 15/00 348/135 |
| 7,081,917 B2 | 7/2006 | Shimoyama et al. | |
| 7,583,373 B2 | 9/2009 | Schwarz | |
| 7,672,049 B2 | 3/2010 | Fruhmann et al. | |
| 7,728,963 B2 | 6/2010 | Kirschner | |
| 7,842,911 B2 | 11/2010 | Kirschner et al. | |
| 8,294,769 B2* | 10/2012 | Otani | E02F 3/847 348/159 |
| 2002/0018122 A1* | 2/2002 | Marold | G01C 15/00 348/207.99 |
| 2008/0018880 A1 | 1/2008 | Matsuo et al. | |
| 2008/0116354 A1* | 5/2008 | Kirschner et al. | 250/208.1 |
| 2008/0120855 A1 | 5/2008 | Matsuo et al. | |
| 2008/0120856 A1 | 5/2008 | Matsuo et al. | |
| 2008/0205707 A1* | 8/2008 | Braunecker | G01C 1/04 382/106 |
| 2008/0297760 A1* | 12/2008 | Herbst | G01C 15/00 356/4.01 |
| 2009/0148037 A1 | 6/2009 | Moriyama et al. | |
| 2011/0131824 A1* | 6/2011 | Yanobe | G01C 15/00 33/292 |
| 2012/0014564 A1 | 1/2012 | Jensen | |
| 2013/0093882 A1* | 4/2013 | Kotzur et al. | 348/135 |

FOREIGN PATENT DOCUMENTS

| | | | |
|---|---|---|---|
| DE | 199 267 06 | A1 | 12/1999 |
| DE | 199 495 80 | A1 | 4/2000 |
| DE | 102 35 888 | A1 | 2/2003 |
| EP | 1 081 459 | A1 | 3/2001 |
| EP | 1 662 278 | A1 | 5/2006 |
| EP | 1 686 350 | A1 | 8/2006 |
| EP | 1676350 | B1 | 12/2009 |
| EP | 2 141 450 | A1 | 1/2010 |
| EP | 2141450 | A1 * | 6/2010 |
| EP | 2 219 011 | A1 | 8/2010 |
| JP | H09-14965 | A † | 1/1997 |
| JP | H10-047959 | A † | 2/1998 |
| JP | 2002-131054 | A † | 5/2002 |
| JP | 2002131054 | A * | 5/2002 |
| JP | 2004-518105 | A | 6/2004 |
| JP | 2005351702 | A * | 12/2005 |
| JP | 2008-032701 | A | 2/2008 |
| WO | 01/35054 | A1 | 5/2001 |
| WO | 2005/026767 | A1 | 3/2005 |
| WO | 2006/053837 | A1 | 5/2006 |
| WO | WO 2009/106144 | A1 * | 9/2009 |
| WO | WO 2009/109202 | A1 * | 9/2009 |

OTHER PUBLICATIONS

European Search Report dated Nov. 15, 2010 as received in application No. EP 10 16 8771.

\* cited by examiner
† cited by third party

GEODETIC SURVEYING DEVICE HAVING AUTOMATIC HIGH-PRECISION TARGET POINT SIGHTING FUNCTIONALITY

FIELD OF THE INVENTION

The invention relates to a geodetic surveying appliance, particularly a theodolite or total station, having an automatic high-precision target sighting functionality for finding the position of a target, to a method for finding the position of a target with geodetic accuracy and to a computer program which can be executed on an electronic data processing unit—in the form of evaluation means in the geodetic surveying appliance.

BACKGROUND

Numerous geodetic surveying appliances have been known for surveying a target since ancient times. In this context, the direction and the angle and usually also the distance from a measuring appliance to the target that is to be surveyed are recorded and also, in particular, the absolute position of the measuring appliance together with any reference points present are captured as spatial standard data.

Generally known examples of such geodetic surveying appliances are a theodolite, a tacheometer and a total station, which is also called an electronic tacheometer or computer-tacheometer. A geodetic measuring apparatus from the prior art is described in the publication document EP 1 686 350, for example. Such appliances have electrosensory angle and possibly distance measuring functions which allow a direction and a distance to a selected target to be determined. In this case, the angle and distance variables are ascertained in the internal reference system of the appliance and may also need to be linked to an external reference system for absolute position finding.

In many geodetic applications, points are surveyed by placing specially designed target objects at said points. These usually consist of a plumb rod having a reflector (e.g. a 360-degree prism) for defining the measurement path or the measurement point. For such surveying tasks, the measurement process is controlled and measurement parameters are stipulated or registered by transmitting a number of data items, instructions, speech and other information between the target object—particularly a hand-held data capture appliance on the part of the target object—and a central measuring appliance. Examples of such data are the identification of the target object (type of prism used), the inclination of the plumb rod, the height of the reflector above ground, reflector constants or measured values, such as temperature or air pressure. This information or these situation-dependent parameters is/are necessary in order to allow high-precision sighting and surveying of the measurement point defined by the plumb rod with the prism.

Modern total stations have microprocessors for digital further processing and storage of captured measurement data. The appliances usually have a compact and integrated design, with usually coaxial distance measuring elements and also computation, control and memory units being present in one appliance. Depending on the expansion level of the total station, there may also be integrated motorization of the sighting and targeting device and—if retroreflectors (for example a 360-degree prism) are used as target objects—means for automatic target searching and tracking. As a man-machine interface, the total station may have an electronic display control unit—generally a microprocessor computation unit with electronic data storage means—having display and input means, e.g. a keypad. The display control unit is supplied with the measurement data captured by electrosensory means, with the result that the position of the target can be ascertained, visually displayed and stored by the display control unit. Total stations known from the prior art may also have a radio data interface for setting up a radio link to external peripheral components, such as a hand-held data capture appliance, which may be in the form of a data logger or field computer, in particular.

To sight or target the target that is to be surveyed, geodetic surveying appliances of the type in question have a telescopic sight, such as an optical telescope, as a targeting device. The telescopic site is generally able to be rotated about a vertical axis and about a horizontal tilt axis relative to a base of the measuring appliance, so that the telescope can be oriented to the point to be surveyed by means of swiveling and tilting. Modern appliances can have, in addition to the optical viewing channel, a camera, integrated into the telescopic sight and having a coaxial or parallel orientation, for example, for acquiring an image, wherein the acquired image can be presented particularly as a live image on the display of the display control unit and/or on a display of the peripheral device used for remote control—such as the data logger. The optical system of the targeting device may have a manual focus—for example an adjusting screw for altering the position of a focusing optical system—or may have an autofocus, with the focus position being altered by servomotors, for example. Such a targeting device for a geodetic surveying appliance is described in European patent application No. 09152540.2, for example. Automatic focusing devices for telescopic sights for geodetic appliances are known from DE 197 107 22, DE 199 267 06 or DE 199 495 80, for example.

The optical system or the optical viewing channel of the sighting device usually contains an objective lens group, an image reversal system, a focusing optical system, a reticle for producing cross hairs and an eyepiece, which are arranged in this order from the object side, for example. The position of the focusing lens group is set depending on the object distance such that a sharp object image arises on the reticle arranged in the focusing plane. Said image can then be viewed through the eyepiece or, by way of example, acquired using a coaxially arranged camera.

By way of example, the design of telescopic sights of the type in question for geodetic appliances is shown in the publication documents EP 1 081 459 and EP 1 662 278.

On account of the beam path that is usually to be utilized jointly both as a viewing channel and for measurements, such appliances require the technical design of said beam path in the manner of construction of a telescope with specialized, high-precision optical systems that are complex to manufacture. Furthermore, an additional separate transmission and reception channel and also an additional image plane for the wavelength of the distance measuring device are provided for the coaxial electronic distance measurement.

Since target objects (e.g. the plumb rods with a target mark such as a 360-degree prism that are usually used for geodetic purposes) can be targeted with sufficient precision with the naked eye (i.e. in accordance with non-geodetic accuracy requirements) using the sighting device, despite the 30-times optical magnification which is often provided, conventional surveying appliances in the meantime have, as standard, an automatic target tracking function for prisms used as a target reflector (ATR: "Automatic Target Recognition"). For this, a further separate ATR light source—e.g. a multimode fiber output, which emits optical radiation having a wavelength in the region of 850 nm—and a specific ATR detector (e.g. CCD area sensor) that is sensitive to this wavelength are conventionally additionally integrated in the telescope.

As part of the ATR fine targeting function, the ATR measurement beam is emitted in the direction of the optical target axis of the sighting device, said measurement beam is retroreflected at the prism, and the reflected beam is captured by the ATR sensor. Depending on the deviation in the orientation of the optical target axis from the prism, the impingement position of the reflected radiation on the ATR sensor also deviates from a central sensor area position in this case (i.e. the reflected spot of the ATR measurement beam retroreflected at the prism on the ATR area sensor is not located in the center of the ATR area sensor and therefore does not impinge at a setpoint position which has been stipulated, e.g. by means of calibration, as that position that corresponds to the optical target axis).

If this is the case, the orientation of the sighting device is slightly readjusted in motorized fashion such that the ATR measurement beam retroreflected at the prism impinges on the ATR area sensor with high precision at the center of the sensor area (i.e. the horizontal and vertical angles of the sighting device are iteratively changed and adjusted in such a way until the center of the reflected spot coincides with the setpoint position on the ATR area sensor). Alternatively, a residual deviation between the impingement point of the retroreflected ATR measurement beam on the ATR area sensor and the center of the sensor area can also be taken into account in calculations and converted into an angle which is added as appropriate to the spatial angle—captured using the angle sensors—at which the target axis points. That is to say that the spatial angle to the target could also be derived in this case from the spatial angle—captured using the angle sensors—of the target axis and a removal of the detected ATR measurement beam reflection from the sensor center (i.e. from that central point on the ATR sensor at which the target axis is depicted).

As a result, it is possible to significantly increase the attainable accuracy for the orientation of the optical target axis onto the prism in comparison with manually performed targeting with cross hairs and on the basis of mere judgement by eye. In order to ensure that the automatic targeting on the basis of evaluation of the position of the reflected spot of the ATR measurement beam retroreflected at the prism on the ART area sensors works, it is necessary—prior to starting a function—to orient the sighting device to the target reflector at least with such approximation that the retroreflected ATR measurement beam also impinges on the ATR area sensor. This can be achieved by means of, by way of example, prior manual targeting of the target reflector on the basis of judgement by eye or by means of the execution of an automatic coarse targeting function.

The manual, coarse sighting of the target object can be performed by the user firstly by viewing and targeting the target object on a user display of the display control unit directly on the surveying appliance or on the display of a separate peripheral device (e.g. a data logger as a remote control). Often, however, this continues to be accomplished by viewing the target through the eyepiece of the telescopic sight (i.e. the sighting device), since in practical use—e.g. in sunlight—a displayed display image on the display control unit or the data logger may be unsatisfactorily discernible.

Besides the ATR fine targeting function, it is also possible for an automatic target tracking functionality to be provided in similar fashion and by using the same ATR components (such as ATR light source and ATR detector). Following a performance of ATR fine targeting (i.e. after the sighting device has been oriented to the destination such that the center of the ATR measurement radiation reflected spot coincides with the setpoint position—corresponding to the target axis—on the ATR area sensor), the sighting device can then continue to track movements by the target "live" and at appropriate speed such that the center of the ATR measurement radiation reflected spot continues to be as accurate as possible and always at the setpoint position on the ATR area sensor. The target is then often referred to as being "locked". Problems may arise in this case when the target moves with such jerkiness and speed that it disappears from the visual range of the ATR detector (i.e. no further ATR measurement radiation reflected at the destination impinges on the ATR area sensor).

By way of example, EP 2 141 450 describes a surveying appliance having a function for automatically targeting a retroreflecting target and having an automatic target tracking functionality. In order to keep the target in the "locked" state and in order not to lose it from the visual range of the fine targeting detector, even in the case of rapid and jerky movements, it is proposed in this case that images of the target be taken in parallel by a camera (that is sensitive in the visible wavelength range) and that image processing be used to track movements by the target (or movements by objects moving together with the target), and thereby that recovery and relocking of the retroreflector be facilitated in the event of the target being lost from the "locked" state.

As an alternative to surveying retroreflecting targets using ATR fine targeting functions as described, the surveying of retroreflectorless targets is also known. However, since targets of such type—when impacted by an ATR measurement beam (as described above)—would reflect this beam diffusely and hence this would mean that a reflected spot that could be evaluated sufficiently in terms of an impingement position is not produced on the ATR area sensor by a long way, such targeting functions as are based on the principle of active impacting of the target with measurement radiation and detection and evaluation of an impingement position for the measurement radiation reflected at the target (such as those described above) cannot be used for retroreflectorless targets. A main disadvantage is therefore the requirement—which exists for surveying appliances from the prior art—of purely manual fine sighting of such retroreflectorless targets, which both often results in insufficient accuracy for the measurement of the spatial angles of the target (since the accuracy for the fine sighting of the target is then dependent on the skill and judgement by eye of a surveyor/user) and requires a high level of complexity (since sufficient patience, circumspection and care are indispensable for manual fine sighting of the target by the user). The manual fine targeting that is required for retroreflectorless targets is thus complex, time-consuming, unreliable and not very robust.

Furthermore, the prior art also discloses methods wherein an image and image processing are used (particularly using a target object position that has been determined in the image taken and on the basis of a known direction in which the image was taken, or a direction that is captured in the process) to ascertain the spatial angles of the measuring appliance with respect to the target object. Such methods are described in WO 2005/026767 or in WO 2006/053837, for example.

In summary: when using appropriate reflectors (particularly retroreflecting prisms) as target objects, automatic ATR fine targeting and target tracking using surveying appliances from the prior art thus works sufficiently well and reliably. The only great disadvantage in this regard is the indispensable need to use such retroreflecting target objects as can be manufactured only with a high level of complexity, such as 360-degree prisms, which are constructed from six single prisms, for example, and in such a manner ensure precise retroreflection of the ATR measurement beam. Accordingly, the costs of manufacture for such retroreflecting 360-degree prisms of very complex design are high. In addition, target objects made from glass are comparatively susceptible to destruction. By contrast, the geodetic surveying of retroreflectorless targets requires manual fine sighting of the target, which is therefore not very robust, not very reliable, not very precise and complex to perform.

SUMMARY

It is therefore an object to provide a surveying system having a high-precision automatic target sighting functionality, wherein even target objects which are less complex to manufacture allow the use of fine sighting and surveying of the target defined by the target object, which nevertheless are accomplished with geodetic accuracy. In particular, the aim in this case is to allow fine sighting (i.e. very exact orientation of the target axis to the target) in a manner which is not very complex, occurs quickly and is reliable and robust even when retroreflectorless targets are used. It is a further object to provide a geodetic surveying appliance for such a surveying system and also a method for the high-precision automatic targeting of a target object which is less complex to manufacture using a geodetic surveying appliance, the targeting and surveying of the target defined by the target object nevertheless being possible with sufficient, geodetic accuracy—and also particularly in a manner which is robust, rapid, reliable and not very complex.

The invention provides a function that is performed in a preprogrammed and automatic fashion for a geodetic surveying appliance for the fine targeting of known target marks by using images which are taken of the target mark.

The target mark (or a set of different target marks) is known in advance in this case and has a structure/form (pattern, shape, etc.) which is suitable for indicating the target on the target mark. The evaluation unit of the surveying appliance also stores a pattern (target mark pattern or target mark template) which corresponds to the structure of the target mark used such that the target mark taken in an image can be recognized from the pattern, made consistent with (i.e. matched to) the depicted target mark in the image, and the position of the depicted target mark in the image can be determined with a high level of precision. On the basis of this determined position of the target mark or of the pattern made consistent with the target mark in the image, the targeting device of the surveying appliance now moves in motorized and automatic fashion such that the target axis of the targeting device is oriented accurately to the target of the target mark.

The steps of taking an image, evaluating the image taken (by using the stored pattern for the target mark and by matching the pattern to the target mark taken in the image) and of moving the targeting device in motorized fashion (i.e. of finely orienting the target axis to the target) take place automatically as part of a process that is executed in preprogrammed fashion.

The invention therefore allows automatic targeting of a target with geodetic accuracy in a manner which is extremely robust, rapid, very reliable and not very complex, without being reliant on the use of comparatively sensitive retroreflectors (such as prisms made of glass) as target marks/target objects.

By way of example, suitable target marks may thus be predefined patterns, e.g. patterns printed on film, which can be produced in a high volume and mounted (in particular adhesively bonded) on a sign which can be attached to a station pole.

The invention thus provides a geodetic surveying appliance which is equipped with an automatic target sighting functionally for finding a position of a target, wherein the target is indicated with a high level of precision in space by a known target mark with an external form designed for this purpose. The geodetic surveying appliance is preferably in the form of a theodolite or total station.

The geodetic surveying appliance is equipped with a targeting device (as a sighting device), particularly a telescopic sight, wherein the targeting device can swivel in motorized fashion relative to a base of the surveying appliance in order to change an orientation of the targeting apparatus. The targeting apparatus is at least equipped with an object-lens unit which defines an optical target axis and with a camera sensor with pixel-defined resolution for acquiring a camera image of the sighted target mark. Furthermore, the targeting apparatus has a beam path between the object-lens unit and the camera sensor.

The geodetic surveying appliance is furthermore equipped with an angle-measuring functionality for the high-precision capture of the orientation of the target axis, and evaluation means for image processing, data storage and control of the orientation of the targeting device.

According to the invention, a target mark pattern corresponding to the external form of the known target mark is stored in the evaluation means in this case, wherein a main point in the target mark pattern is predefined as indicating the target.

In addition, according to the invention, the evaluation means are thus designed to execute the automatic target sighting functionality such that the start of the function is automatically followed by a performance of the following steps:

a camera image of the target mark is taken,
the target mark pattern is matched to, in particular made consistent with, the target mark in the camera image by means of image processing, and
the orientation of the targeting device is changed in motorized fashion on the basis of a position of the main point in the camera image in a matched state of the target mark pattern such that the optical target axis is orientated with a high level of precision to the target.

Typically, the high-precision orientation of the optical target axis to the target is achieved by virtue of the steps of taking an image, matching and changing being effected repeatedly and the high-precision orientation being effected iteratively by convergence (i.e. the orientation is altered iteratively such that the distance from the main point in the target mark pattern to the target axis image point in the images taken is reduced in steps and finally the main point is aligned with the target axis image point).

In this case, a target axis image point is understood to mean that position in the image at which the point in space that is intersected by the target axis is depicted on the camera area sensor. The target axis image point or the target axis position in the camera image thus corresponds to the point in the camera image which the target axis targets. By calibrating the camera, it is possible for this target axis image point to be determined and defined in advance (as a target axis position in the image), for example. In this case, the target axis position may also be determined in the subpixel range, i.e. with a high level of accuracy in the pixel-defined resolution of the camera sensor, in the course of calibration.

In other words, the evaluation means can thus determine the positions of the main point in the respectively taken camera images and also deviations in these positions from the target axis image point in the respective camera images as part of the automatic target sighting functionality—preferably after the step of matching. The orientation of the targeting device is then changed iteratively such that finally the position of the main point in the matched target mark pattern coincides with the target axis position in the image.

To assist/speed up the iterative convergence process or alternatively to drive the sighting device toward the target directly in motorized fashion such that the target axis is oriented thereto with a high level of precision, it is also possible to determine the position of the main point in the camera image and a deviation in this position from the target axis position in the camera image directly and to derive an angular offset therefrom which separates the target axis from an existence oriented to the target. From this angular offset, it is then possible to directly ascertain the horizontal and vertical angles through which the sighting device needs to be rotated in motorized fashion so that the optical target axis is oriented to the target with a high level of precision. Following a corresponding change of orientation by the ascertained horizontal and vertical angles, it is now also possible to perform a check by taking a further camera image of the target mark, again making the target mark pattern consistent with the target mark in this camera image by means of image processing, and checking whether the position of the main point in the matched target mark pattern in the camera image now coincides sufficiently accurately to the target axis position. If necessary, the sighting device orientation can again be adjusted on the basis of an offset between the position of the main point and the target axis position.

Alternatively, the angular offset (which is derived from a deviation in the position of the main point in the camera image from the target axis position in the camera image) can also be added directly to the target axis angle at which the target axis points—which is captured using the angle sensors of the surveying appliance—as appropriate and therefore the sought spatial angle relative to the target can be ascertained. In this case, it is thus possible for the sought spatial angle relative to the target also to be determined directly from the current target axis angle—captured using the angle sensors—and a residual deviation in the position of the main point in the camera image from the target axis position in the camera image (e.g. from a camera sensor center) without actively changing the orientation of the target axis—to approach the target.

In order to determine the position of the main point in the matched target mark pattern in the image and also in order to determine an offset in the position of the main point from the target axis position, it is possible to use all methods of image evaluation which are suitable for this purpose and which are already sufficiently well known from the prior art, as described—purely by way of example—in WO 2005/026767, for example.

As part of the targeting function according to the invention using the camera integrated in the sighting device, it is thus even possible for the position of the main point in the matched target mark pattern in the camera image to be determined with a higher level of accuracy than the pixel-defined resolution of the camera sensor and for the orientation of the targeting device to be changed such that the position of the main point and the target axis position coincide with one another in corresponding fashion with a higher level of accuracy than the pixel-defined resolution of the camera sensor. Such improved accuracy can be achieved, by way of example, when the main point in the target mark pattern corresponds to a marking, for example a point in the geometric center on a known target pattern, as a result of which it is possible to determine the situation of the main point in the camera image as a geometric mean of the pixel values for the boundary of the target mark in the camera image.

The target mark pattern stored may be a target mark template, for example. In particular, a set of different target marks which each define a target with a high level of precision is known, for each of which a target mark pattern database in the evaluation means stores corresponding target mark patterns. In this case, it is advantageous if the user of the surveying appliance is able to select the respective target mark used and to call up the corresponding target mark pattern for the target sighting functionality from the target mark pattern database. Alternatively, the target mark pattern—corresponding to the target mark used in the field—can also be selected from the database automatically, for example in the case of an active target mark (i.e. target mark which transmits its identity to the surveying appliance by radio or optically, for example), or by means of prior or parallel identification by the surveying appliance itself (e.g. by target mark identification in the taken camera image by means of image processing, particularly if the target mark bears an identification feature such as a barcode for this purpose).

In one particular embodiment, the evaluation means are designed to execute the automatic target sighting functionality such that the step of matching is preceded by scaling of the stored target mark pattern that is to be matched being effected on the basis of a known, estimated and/or at least roughly determined distance to the target mark. This can be accomplished particularly on the basis of a current focus position for a focusing element of the targeting device that is arranged in the beam path between the objective-lens unit and the camera sensor.

In another refinement, which may also be combined with the embodiment described above, the evaluation means are designed such that the step of matching is followed by the use of scaling of the target mark pattern made consistent with the target mark in the camera image in order to determine a distance to the target mark.

In a further, likewise combinable embodiment, the evaluation means are designed such that the step of matching (i.e. the step of making consistent) is preceded by adjustment—particularly rotation and/or distortion—of the target mark pattern that is to be matched being effected on the basis of a known, estimated and/or at least roughly determined orientation of the target mark in space.

The evaluation means may also be designed such that the matching is followed by the use of a rotation and/or distortion of the target mark pattern made consistent with the target mark in the camera image in order to determine an orientation of the target mark in space. In this case, it is possible to determine particularly a horizontal orientation and/or an inclination of the target mark.

It is preferred for the geodetic surveying appliance according to the invention to be equipped not only with the camera that is integrated into the sighting device and that is arranged, in particular, coaxially with respect to the optical axis (what is known as an on-axis camera) but also with an overview camera for acquiring an overview image.

The on-axis camera and the overview camera may be in the form of a digital camera, for example in the form of CMOS or CCD area array and sensitive at least in the visible spectral range, having a resolution of approximately 2 to 5 million pixels, for example. Since the on-axis camera is at a lower level than the objective lens—having the effect of multiple magnification—of the sighting device (with a 30-times optical fixed zoom, for example), this camera has a relatively narrowly restricted field of vision, whereas the overview camera—which is positioned on or is at a higher level than the sighting device, for example—with its own objective lens (particularly without an optical magnification effect) has a wide field of vision and—as is known from the prior art—can be used by the user to easily find a target (e.g. when the live image captured by this overview camera is displayed on a data logger).

The geodetic surveying appliance according to the invention preferably comprises at least one apparatus for electronic distance measurement and/or a horizontal angle sensor and/or a vertical angle sensor.

The invention also relates to a system comprising a geodetic surveying appliance—according to one of the previously cited embodiments—having an automatic target sighting functionality for finding the position of a target with a high level of precision and having one or more target marks which each define one or more targets.

Advantageously, the one or more target marks may be provided with an additional identification tag or feature, e.g. a barcode. In this case, it is also preferred for the identification tags corresponding library element to be stored together with the corresponding target mark patterns in a target mark pattern database.

As is known from the prior art for prisms as target marks, the identification tag or feature (e.g. the barcode) may also involve the storage—in a manner which can be read using image processing—of supplementary information, such as measurement instructions (e.g. the instruction that a target needs to be surveyed ten times), reflector height, information relating to the main point in the target pattern, etc. In addition, the identification tag may be in a form such that either only a corresponding type of target mark is indicated or else an explicit identification can be read (for example a target code number which occurs only once in the measurement environment). However, the identification tag can also be used to indicate the type of the target mark and an explicit code number.

Furthermore, one or more target marks may now be in retroreflectorless form, i.e. the invention makes it possible to dispense with retroreflecting elements which are complex to manufacture.

The invention also relates to a method for automatic target sighting using a system according to the invention as described above. In a first method step, a known target mark which defines a target is selected and put on to an object with a target that is to be observed. The targeting apparatus is then oriented to the target mark and a camera image of the sighted target mark is taken using the camera sensor. Optionally, the camera image can be stored using the evaluation means.

A characteristic feature of the method according to the invention is that a stored target mark pattern—corresponding to the known target mark—with a predefined main point indicating the target is loaded from the evaluation means and the target mark pattern is matched to the target mark in the camera image by means of image processing, particularly made consistent by means of superimposition, for example. Furthermore, the orientation of the targeting device is changed in motorized fashion on the basis of a position of the main point in the camera image in the matched state of the target mark pattern in such a way until the optical target axis is oriented to the target with a high level of precision. If necessary, this can be accomplished iteratively by repeating the steps of image taking, matching and changing the orientation of the targeting apparatus.

In one development of the method according to the invention, the step of taking a camera image using the camera sensor is preceded by the taking of an overview image with the overview detector in order to determine a position of a depiction of the target mark in the overview image.

One possible embodiment is distinguished in that the evaluation means are used, prior to the step of matching, to effect scaling of the target mark pattern to be matched on the basis of a known, estimated and/or at least roughly determined distance to the target mark. This can be accomplished particularly on the basis of a current focus position for a focusing element of the targeting device that is arranged in the beam path between the objective-lens unit and the camera sensor.

In another variant, which is compatible with the embodiment cited above, the evaluation means are used, following the matching, to use scaling of the target mark pattern made consistent with the target mark in the camera image in order to determine a distance to the target mark.

In a further, likewise compatible embodiment, the step of matching is preceded by adjustment, particularly rotation and/or distortion, of the target mark pattern that is to be matched being performed on the basis of a known, estimated and/or at least roughly determined orientation of the target mark in space.

Alternatively, or in addition, the evaluation means can be used, following the matching, to use rotation and/or distortion of the target mark pattern matched to the target mark in the camera image in order to determine an orientation of the target mark in space, particularly to determine a horizontal orientation and an inclination of the target mark.

The invention also relates to a computer program product having program code which is stored on a machine-readable storage medium for the purpose of carrying out the method according to the invention.

BRIEF DESCRIPTION OF THE DRAWINGS

The method according to the invention and the apparatus according to the invention are described in more detail below purely by way of example with reference to specific exemplary embodiments which are shown schematically in the drawings, with further advantages of the invention also being discussed. Specifically:

FIGS. 4*a*-6*b* show examples of different embodiments of target marks and target mark patterns;

DETAILED DESCRIPTION

Figure 1:
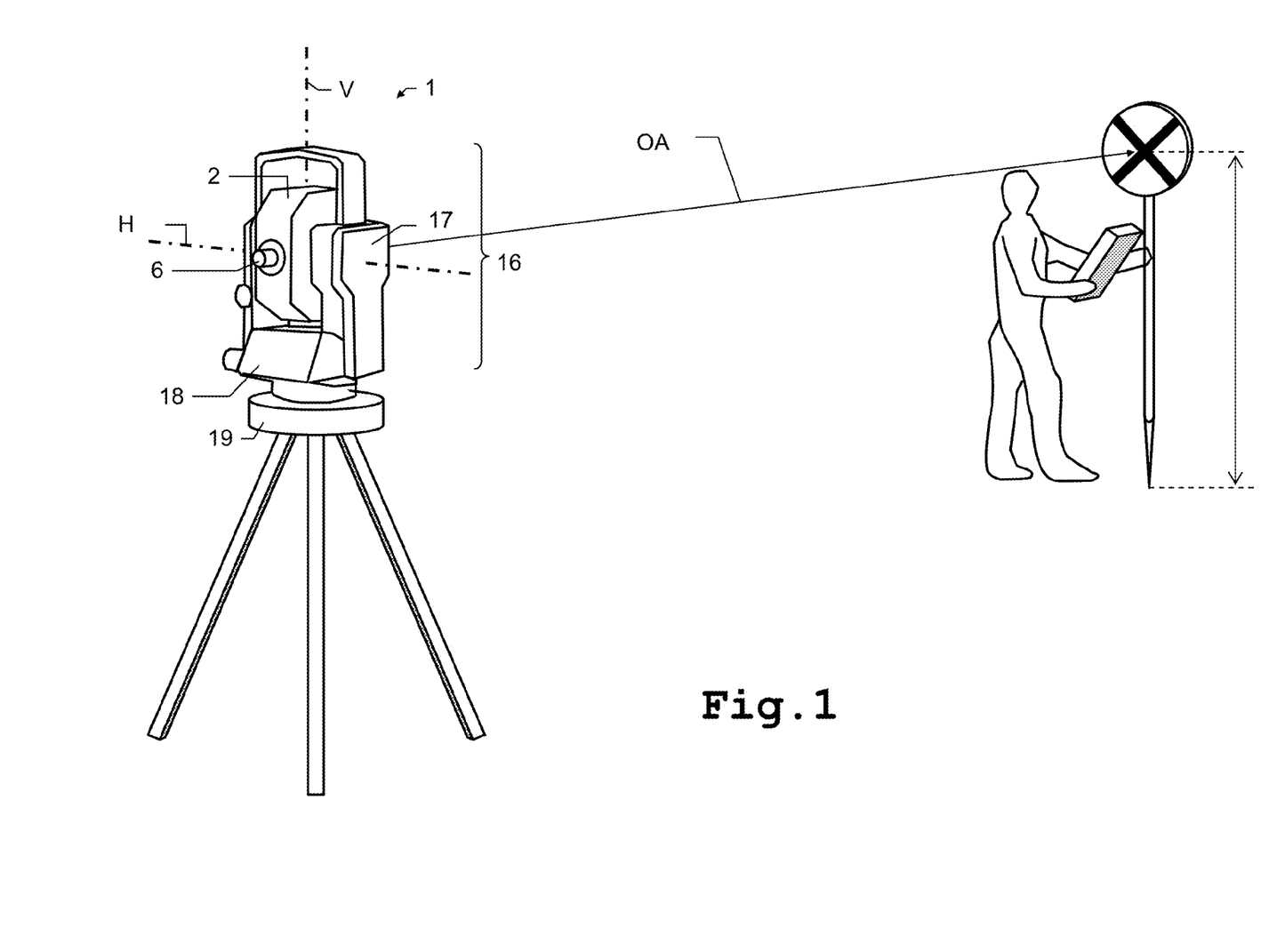
FIG. 1 shows a geodetic surveying appliance according to the invention which is in the form of a total station.

FIG. 1 shows a geodetic surveying appliance 1 according to the invention which is in the form of a total station for the purpose of measuring horizontal angles, vertical angles and distances relating to a target object at a distance.

The total station is arranged on a tripod, with a base 19 of the total station being connected directly and permanently to the tripod. The main body of the total station, which is also referred to as the upper portion 16, can be rotated relative to the base 19 about a vertical axis V.

In this case, the upper portion 16 has a support 17—e.g. formed by two columns, a sighting device 2 mounted between the columns so as to be able to rotate about the horizontal tilt axis H, and an electronic display control unit 18. The display control unit 18 may be designed in a known manner to control the surveying appliance 1 and also to process, display and store measurement data.

The targeting or sighting device 2 is arranged on the support 17 so as to be able to rotate about a horizontal tilt axis H and can therefore be swiveled and tilted horizontally and vertically relative to the base 19 for the purpose of orientation to a target object. In this case, the sighting device is in the form of a shared sighting device unit, with at least an objective lens, a focusing optical system, a coaxial camera sensor, the mini display component according to the invention, the eyepiece 6 and particularly a graphics processor being integrated in a shared sighting device housing.

The sighting device 2 can be used to target the target object (i.e. to orient the target axis of the sighting device 2 to the target of the target mark) and to capture the distance from the total station to the target object by electrosensory means. In addition, means for the electro sensory capture of the angle orientation of the upper portion 16 relative to the base 19 and of the sighting device 2 relative to the support 17 are provided. These measurement data captured by electrosensory means are supplied to the display control unit 18 and are processed thereby, with the result that the position of the target relative to the total station can be ascertained, visually displayed and stored by the display control unit 18.

Within the context of the invention, the process of fine, high-precision targeting of the target of the target object, as defined by the target mark, can now be effected according to the invention by means of the following steps, which take place automatically as part of the preprogrammed targeting function:
  a camera image of the target mark is taken,
  the target mark pattern is matched to, in particular made consistent with, the target mark in the camera image by means of image processing, and
  the orientation of the targeting device is changed in motorized fashion on the basis of an ascertained position of the target mark pattern matched in the camera image such that the optical target axis (OA) is oriented with a high level of precision to the target.

In this case, the automatic fine targeting function according to the invention which is provided by the surveying appliance shown in FIG. 1 can also be executed in preprogrammed fashion in accordance with the developments and specific variants already described previously.

Figure 2:
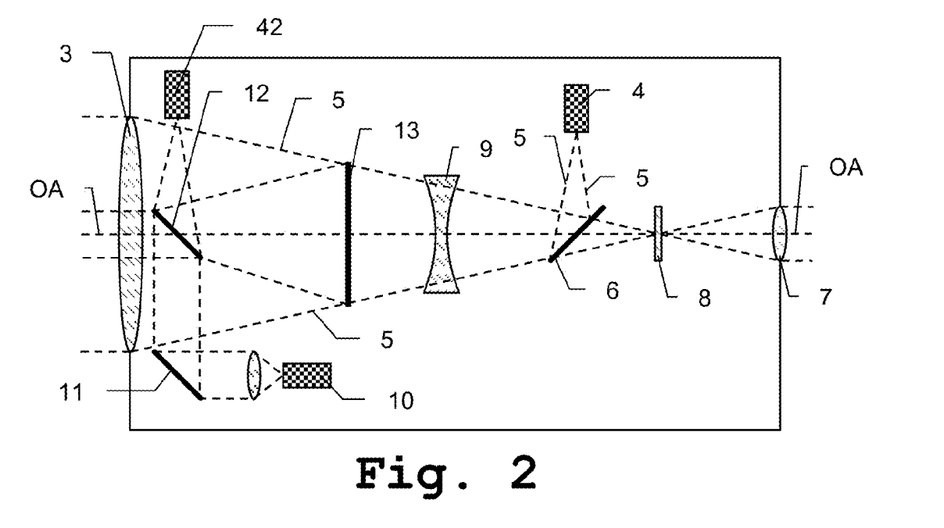
FIG. 2 shows a first embodiment of an optical design for a targeting device of a geodetic surveying appliance according to the invention.

FIG. 2 shows a first embodiment of an optical design for a targeting device in a geodetic surveying appliance according to the invention. An objective-lens unit 3 and the associated beam path from a target or object to be sighted through the objective-lens unit 3 are used to define an optical target axis OA which needs to be oriented to the target or object to be observed. The objective-lens unit 3 may be of multilens design.

A camera sensor 4 with pixel-defined resolution is used to acquire a camera image of an object, target or target mark that is to be sighted.

Figure 3:
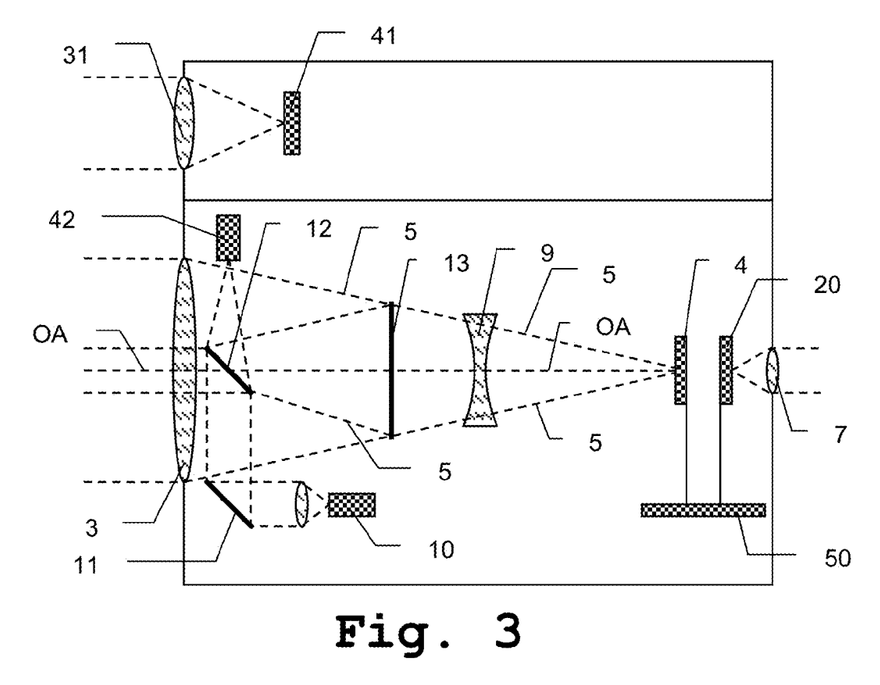
FIG. 3 shows a second embodiment of an optical design for a targeting device of a geodetic surveying appliance according to the invention.

Extending from the objective-lens unit 3 to the camera sensor 4 is a beam path 5 which can be convoluted with an optical deflection element 6, as shown in FIG. 2, or may be in continuously linear form, as shown in FIG. 3. The optical deflection element 6 may be in the form of a beam splitter or a partially reflecting mirror, for example, with the result that a portion, e.g. 50%, of the light routed to the deflection element 6 in the beam path 5 is directed onto the camera sensor 4 and another portion can propagate further in the direction of the target axis to an eyepiece unit 7 for an observer. In the direction of propagation of the light captured by the objective-lens unit 3, an alignment or orientation aid 8, for example cross hairs, may be arranged in front of the eyepiece. Furthermore, the beam path between the objective-lens unit 3 and the optical deflection element 6 may contain a focusing element 9, the positioning of which can be altered along the axis OA, for altering the focusing position for the light captured by the objective-lens unit 3. The focusing element 9 may be in multilens form. Advantageously, the focusing element 9 is provided with stable, precisely reproducible positioning for image acquisition from objects arranged at a great distance using a de facto parallel beam path to the objective-lens unit 3.

Optionally, the arrangement may additionally be equipped with means for electrooptical distance measurement. To this end, as shown in FIG. 2, it is possible to use a measurement radiation source 10 (e.g. emitting in the near infrared spectral range, which is invisible to the human eye), the measurement radiation from which is deflected by means of an optical deflection element 11, for example a mirror, onto a further optical deflection element 12, for example a dichroic beam splitter which reflects in the spectral range of the light source 10 and transmits in the remainder of the spectral range, and from there onward through the objective-lens unit 3 to a target mark that is to be sighted. In this optional embodiment of an optical design for a targeting device of the geodetic surveying appliance according to the invention, a portion of the light reflected diffusely or directionally from the target, captured by the objective-lens unit 3 and having the wavelength of the light source 10 passes through the deflection element 12 and propagates further to a dichroic output beam coupler 13 which is in a form that reflects light from the emission wavelength of the light source 10 and transmits light from the remainder of the spectral range. The measurement light reflected by the dichroic output beam coupler 13 is directed via the deflection element to a detector 42 for electrooptical distance measurement. By way of example, the light source 10 may be pulsed and the distance measurement can take place in a known manner by determining pulse propagation times or phase differences between emitted and reflected light.

As is known from the prior art and explained in detail above in the introductory part of the description, the surveying appliance according to the invention may also, moreover, have an ATR fine target sighting functionality which is designed for use together with retroreflectors as targets, for which purpose the targeting device may additionally contain components (such as an ATR light source and an ATR detector, and also appropriate beam-guiding optical elements) designed for this purpose (these are not shown as an aid to simpler understanding of the core of the invention).

An alternative, second embodiment of an optical design for a targeting device of a geodetic surveying appliance according to the invention is shown in FIG. 3. Essentially, this arrangement differs from the configuration shown in FIG. 2 in that the beam path 5 to the camera sensor 4 is not convoluted by means of an optical deflection element 3, but rather the camera sensor 4 is arranged on the optical target axis OA. The beam path from the objective-lens unit along the optical target axis OA is terminated with the camera sensor 4 in this arrangement. FIG. 3 indicates that the camera sensor 4 is connected to evaluation means 50. These evaluation means 50 can output the currently acquired image from the camera sensor, possibly with superimposed target mark patterns, to a display 20, possibly such that an observer is provided with an impression as if he were seeing a direct "telescope depiction" of an observed object, target or target pattern through the eyepiece 7.

The arrangement shown in FIG. 3 additionally comprises a second objective-lens unit 31 and an overview detector 41 for acquiring an overview image. Preferably, the overview detector 41 is likewise connected to the evaluation means 50 (not indicated in FIG. 3). In contrast to the on-axis camera 4, which is at a lower level than the objective lens 3—having a multiple magnification effect (e.g. 30× zoom)—of the targeting device and hence has a relatively narrow field of vision, the objective-lens unit 31 may in this case be in the form such that no magnification factor or only a very small magnification factor is prompted and hence the overview camera 41 covers a comparatively wide field of vision.

The arrangement shown in FIG. 2 may also be equipped with such an apparatus for acquiring an overview image.

In order to assist/develop the automated targeting process, the invention may in this case involve the additional provision of an automatic coarse target sighting functionality—that is effected before the fine targeting. This function can be used particularly when the target mark is not yet in the relatively narrow range of the field of vision of the on-axis camera. In this case, an overview image can be taken of the target mark by the overview camera 41—which has the comparatively much wider field of vision range—and image processing of the overview image can be used to orient the targeting device to the target mark in coarse, automatically motorized fashion.

In particular, a similar procedure which is also executed as part of the fine target sighting functionality according to the invention can take place for this. That is to say that when the overview image has been taken as part of the optional coarse target sighting functionality, the target mark template stored for the known target mark that is used can be matched to the target mark taken in the overview image, and the position of the target mark template in the overview image (in the matched state of the template) can then be taken as a basis for moving the targeting device automatically on the basis of this position to the target mark in motorized fashion for the purpose of coarse orientation. In this case, the coarse targeting should now take place at least with such accuracy that the target mark is located in the field of vision of the on-axis camera 4 following such a performance of coarse orientation of the targeting device. Next, the fine targeting can take place in automated fashion. In particular, the coarse and fine targeting procedures can in this case also take place automatically in direct succession (i.e. automatically after one another) under the initiation of a single user command.

Furthermore, it goes without saying that the embodiment shown in FIG. 3 may also additionally have appropriate components known from the prior art (such as an ATR light source and an ATR detector, and possibly corresponding beam-guiding optical elements) which provide an ATR fine target sighting functionality designed for retroreflectors.

Figure 4A:
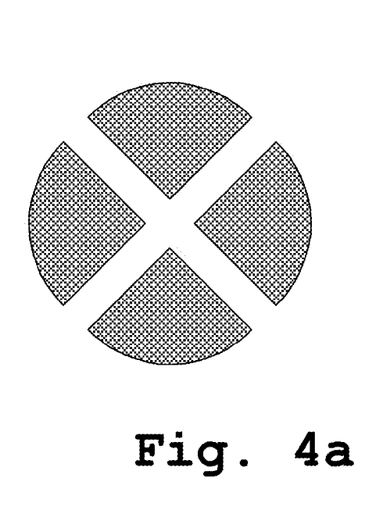
Figure 4B:
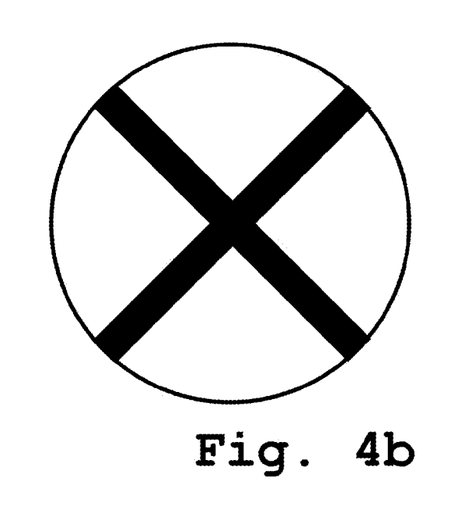
Figure 5A:
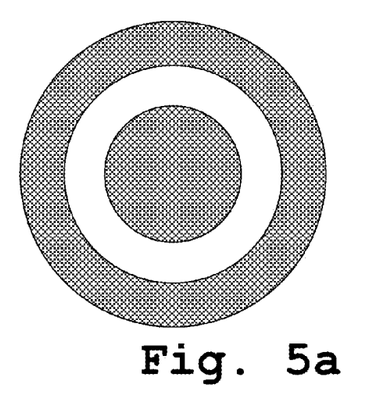
Figure 5B:
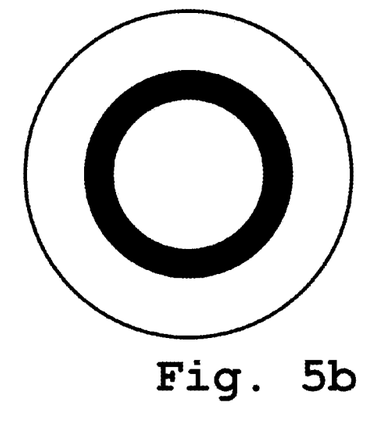
Figure 6A:
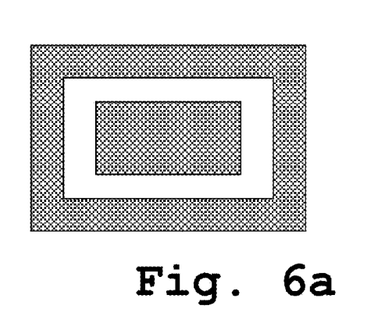
Figure 6B:
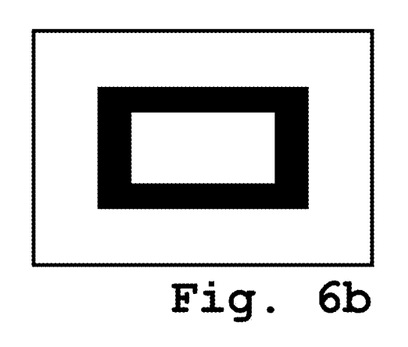

FIGS. 4 to 6 show various possible embodiments of target patterns (in each case on the right) and target mark templates stored therefor as target mark patterns (on the left), which in these embodiments are each in the form of a negative or a complementary image for the associated target pattern. It is evident that these are purely exemplary embodiments which can be extended and augmented as desired. It is advantageous if an explicitly identifiable target, such as the point of intersection in a cross, is indicated on the target mark and a main point indicating this target is predefined in the associated stored target mark pattern.

The variants shown purely by way of example in FIGS. 4 to 6 can naturally be adapted in this case by using aspects that are known from the prior art for the design of suitable target marks—as described in US 2009/0148037 for example.

The figures below illustrate the processes of matching an image taken of a target mark to a stored target mark pattern and subsequently changing the orientation of the targeting apparatus until the optical target axis is oriented to the target.

Figure 7A:
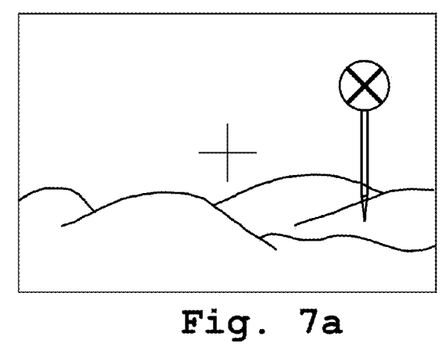
FIGS. 7*a-f* show a first example of the matching of the depiction of a target mark in a camera image to a stored target mark pattern.

FIG. 7a shows an image taken of a target mark positioned in a terrain. The cross hairs in the center of the image indicate the instantaneous orientation of the targeting apparatus.

Figure 7B:
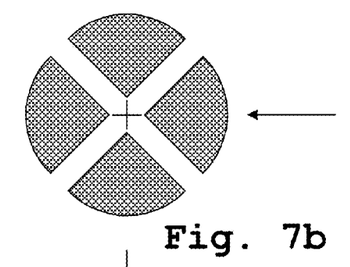
Figure 7C:
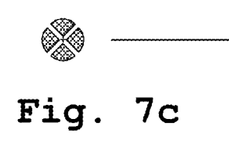
Figure 7D:
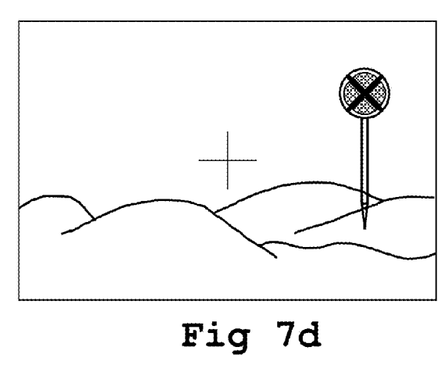
Figure 7E:
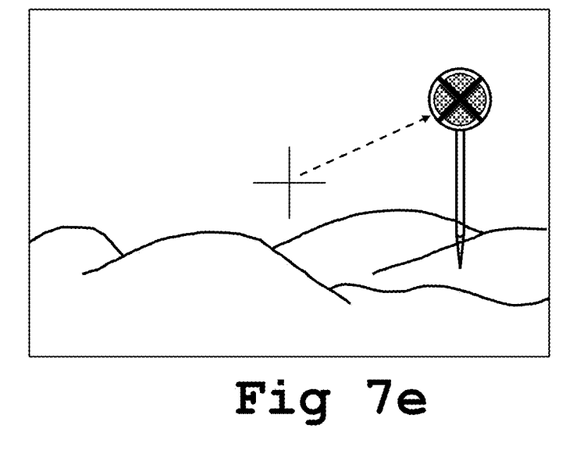
Figure 7F:
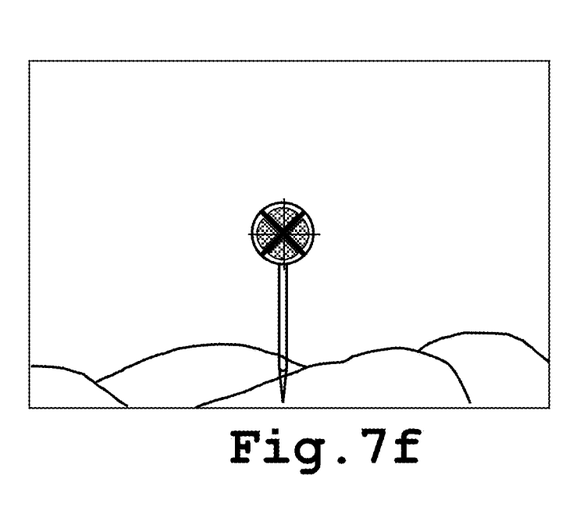

FIG. 7b shows an associated target mark pattern, in the form of target mark template, with a main point that is indicated by a cross in the center. Subsequently, as indicated in FIG. 7c, the size of the target mark pattern onto which the camera image is intended to be superimposed is scaled to the size of the current image of the target mark, and the scaled target mark pattern is aligned with the depiction of the target mark in the camera image (FIG. 7d). In this example, the target mark is oriented very accurately in the direction of the geodetic surveying appliance, corresponding to a front view, rather than horizontally rotated about an axis, defined by the supporting vertical plumb rod; the reason is that the target pattern and the image of the target mark can be accurately aligned. At the unaltered position of the cross hairs in the camera image, it is possible to see that the orientation has not been altered hitherto. FIGS. 7e and 7f illustrate how the orientation of the targeting device is then subsequently changed (in motorized fashion) by aligning the cross hairs with the main point in the target mark pattern and hence orienting the optical target axis with a high level of precision to the target on the target mark. The angle measuring functionality of the geodetic surveying appliance according to the invention is used to measure the orientation of the target axis with a high level of precision during the entire process.

FIGS. 8a to 8e illustrate how rotation of the target mark about a horizontal axis during matching of the target mark pattern and the camera image of the target mark can be compensated for and a horizontal orientation of the target mark determined.

Figure 8A:
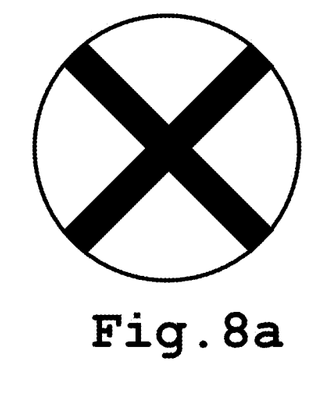
FIGS. 8*a-e* show a second example of the matching of the depiction of a target mark in a camera image to a stored target mark pattern, with a distortion of the target mark relative to an observer being taken into account.
Figure 8B:
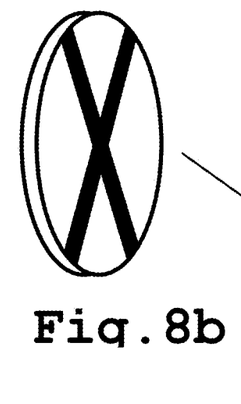
Figure 8C:
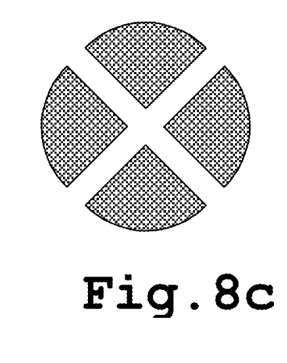
Figure 8D:
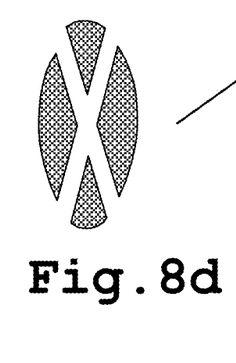
Figure 8E:
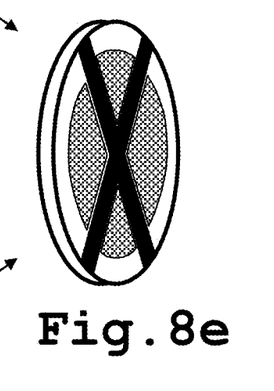

FIG. 8a illustrates a front view of a circular target mark, and FIG. 8c shows an associated target mark pattern corresponding to the front view. The patterns have point symmetry in relation to their geometric centers, and the black and white "bars" are of equal length. The area contents of the segments situated in between are of equal size.

FIG. 8b illustrates the view of a target mark as it presents itself relative to an observer in the event of rotation (about a vertical axis when the target mark is set up vertically in the field): the left-hand half of the target mark is situated closer to the observer than the right-hand half, and therefore the closer bar portions and area segments appear to be larger than the rear ones. In this case, the situation assumed is that there is no rotation or tilting about a horizontal axis in the field that would result in additional distortions in the relative dimensions. From the quotients of the length and area dimensions—the depiction of which is distorted—of "front" and "rear" components, particularly also in comparison with the relative ratios in the "undistorted", i.e. nonrotated state (in this example 1:1), it is possible to determine the deviations from the orientation in accordance with the front view by means of simple, known geometric considerations and calculations based thereon. In order to determine such a deviation in accordance with a front view of the target mark on an angle basis with a high level of accuracy, the target mark pattern is rotated about a virtual axis, with the relevant line and area dimensions thereof changing in a precisely known and calculable manner (see FIG. 8d) until it can be exactly aligned with the image of the target mark (see FIG. 8e). In a totally similar manner, it is also possible to take into consideration, and to quantitatively determine with a high level of accuracy, rotation or tilting about a horizontal axis, or mixing or superimposition of rotations about both axes.

FIGS. 9a to 9e show a similar exemplary embodiment with a target mark which is square in the "unrotated" state, wherein additionally it is also possible to easily determine length dimensions of objects at the same distance as the target mark.

Figure 9A:
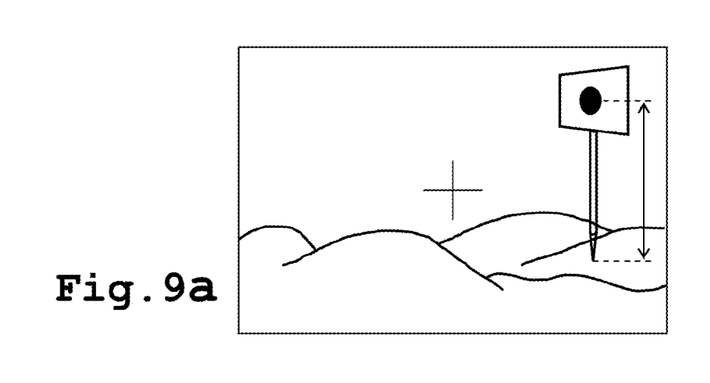
FIGS. 9a-e show a further example of the matching of the depiction of a target mark in a camera image to a stored target mark pattern, with length scaling additionally being performed.

FIG. 9a shows the target mark rotated about a vertical axis in comparison with a front view, said target mark being mounted on a plumb rod of known length and having a known distance between the target and the lower end of the plumb rod.

Figure 9B:
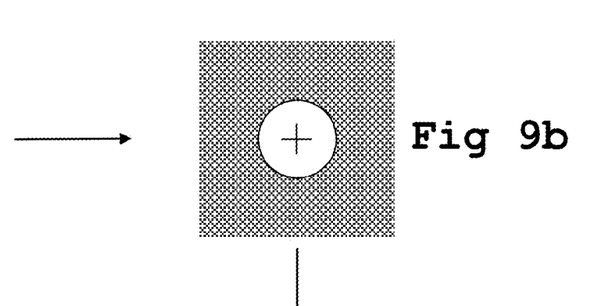

FIG. 9b shows a suitable target mark pattern that has been retrieved from a target mark pattern database, with a main point indicated in the geometric center of said target mark pattern.

Figure 9C:
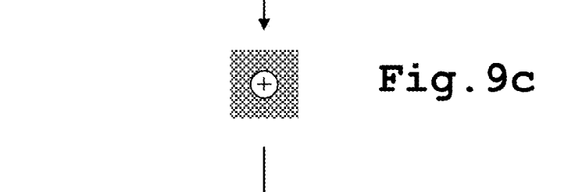
Figure 9D:
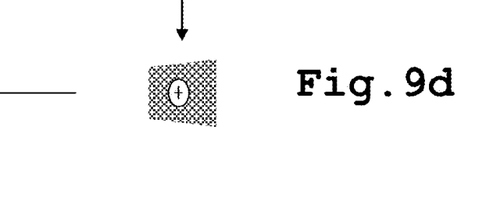
Figure 9E:
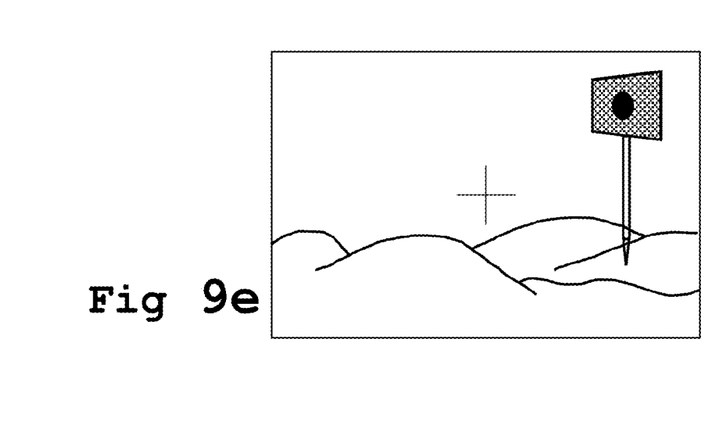

FIG. 9c illustrates how the presentation of the target mark pattern is scaled down in order to be able to align it with the current image of the target mark later. The scaled-down target mark pattern is then again rotated about a virtual axis so as then to superimpose the current image of the target mark onto it congruently. The concluding step, as explained previously in relation to FIG. 6e, would then be to change the orientation of the targeting device by aligning the cross hairs with the main point in the target mark pattern and hence orienting the optical target axis with a high level of precision to the target on the target mark. By scaling with the known distance between the target on the target mark and the lower end of the plumb rod, it is then possible to determine the dimensions of the objects that are situated at the same distance from the observer.

It goes without saying that these presented figures schematically show only possible exemplary embodiments. The various approaches can likewise be combined with one another and with methods from the prior art.

Within the context of the present invention, the term "geodetic surveying appliance" is always intended to be understood in generalized fashion to mean a measuring instrument which has apparatuses for measuring or checking data with a spatial reference, but particularly a theodolite or a total station. In particular, this relates to the measurement of distance and/or direction or angles in relation to a target or measurement point indicated by a target mark. Furthermore, however, there may also be further apparatuses present, e.g. components for satellite-assisted position finding (for example GPS, GLONASS or GALILEO), which can be used for complementary measurements or data recordings.

What is claimed is:

1. A geodetic surveying appliance for fine sighting of a target defining a surveying point which is indicated with a high level of precision in space by a known target mark with an external form designed for this purpose, comprising:
   a targeting device, wherein the targeting device can swivel in motorized fashion relative to a base of the surveying appliance in order to change the orientation thereof, and includes:
      an objective-lens unit which defines an optical target axis; and
      a fine targeting camera sensor for acquiring a camera image of the sighted target mark;
   an angle sensor for the high-precision capture of the orientation of the target axis, and
   electronic data processing unit configured to perform image processing, data storage and control of the orientation of the targeting device, wherein:
   a set of different target marks, which each define a target defining a surveying point with a high level of precision, is known, for each of which a target mark pattern database in the electronic data processing unit stores corresponding target mark patterns,
   whereby automatically or by the user of the surveying appliance the respective target mark used is selectable and the corresponding target mark pattern for an automatic target fine sighting functionality from the target mark pattern database is called up and
   whereby each target mark pattern corresponds to the external form of one of the known target marks, each target mark pattern is embodied as a target mark template, and a main point in each target mark patter is defined as indicating the target, and in that
      the electronic data processing unit is designed to execute the automatic fine target sighting functionality after execution of a manual or automatic coarse target sighting whereby the coarse target sighting is executed without the fine targeting camera and in the course of the coarse target sighting the targeting device is oriented to the target mark at least with such accuracy that the target mark is in the field of vision of the camera sensor, whereby the start of the automatic fine target sighting functionality is automatically followed by performance of the following steps:
      taking a camera image of the target mark;
      matching the target mark pattern to the target mark in the camera image by means of image processing, wherein the target mark pattern in the camera image is made consistent with the target mark, such that it is aligned with the depiction of the target mark in the camera image;
      determining a position of the main point of the target mark pattern in the camera image in the matched state of the target mark pattern; and
      changing the orientation of the targeting device in a motorized fashion on the basis of the determined position of the main point in the camera image such that the optical target axis is oriented with a high level of precision to the target.

2. The geodetic surveying appliance as claimed in claim 1, wherein the geodetic surveying appliance is a theodolite or total station.

3. The geodetic surveying appliance as claimed in claim 1, wherein the targeting device includes a telescopic sight.

4. The geodetic surveying appliance as claimed in claim 1, wherein the target mark pattern is made consistent with the target mark in the camera image by means of image processing.

5. The geodetic surveying appliance as claimed in claim 1, wherein the electronic data processing unit is designed to execute the automatic target sighting functionality such that the high-precision orientation of the optical target axis to the target is achieved by virtue of the steps of taking an image, matching and changing being effected repeatedly and the high-precision orientation being effected iteratively by convergence.

6. The geodetic surveying appliance as claimed in claim 1, wherein the electronic data processing unit is designed to execute the automatic target sighting functionality such that the step of matching is followed by determination of a deviation in a position of the main point from a target axis position in the camera image, which target axis position corresponds to the point in the camera image which the target axis targets, and the orientation of the targeting device is changed iteratively such that the position of the main point and the target axis position coincide.

7. The geodetic surveying appliance as claimed in claim 6, wherein the electronic data processing unit is designed to execute the automatic target sighting functionality such that the position of the main point in the camera image is determined in the subpixel range, i.e. with a higher level of accuracy than a pixel-defined resolution of the camera sensor, and the orientation of the targeting device is changed such that the position of the main point and the target axis position coincide in the subpixel range, i.e. with a higher level of accuracy than the pixel-defined resolution of the camera sensor.

8. The geodetic surveying appliance as claimed in claim 1, wherein the electronic data processing unit is designed to execute the automatic target sighting functionality such that the step of matching is preceded by scaling of the target mark pattern that is to be matched being effected on the basis of a known, estimated and/or at least roughly determined distance to the target mark.

9. The geodetic surveying appliance as claimed in claim 1, wherein the electronic data processing unit is designed to execute the automatic target sighting functionality such that the step of matching is preceded by scaling of the target mark pattern that is to be matched being effected on the basis of a known, estimated and/or at least roughly determined distance to the target mark on the basis of a current focus position of a focusing element of the targeting device that is arranged in the beam path between the objective-lens unit and the camera sensor.

10. The geodetic surveying appliance as claimed in claim 1, wherein the electronic data processing unit is designed to execute the automatic target sighting functionality such that the matching is followed by the use of scaling of the target mark pattern matched to the target mark in the camera image in order to determine a distance to the target mark.

11. The geodetic surveying appliance as claimed in claim 1, wherein the electronic data processing unit is designed to execute the automatic target sighting functionality such that the step of matching is preceded by adjustment, particularly rotation and/or distortion, of the target mark pattern that is to be matched being effected on the basis of a known, estimated and/or at least roughly determined orientation of the target mark in space.

12. The geodetic surveying appliance as claimed in claim 1, wherein the electronic data processing unit is designed to execute the automatic target sighting functionality such that the matching is followed by the use of a rotation and/or distortion of the target mark pattern matched to the target mark in the camera image in order to determine an orientation of the target mark in space.

13. A geodetic surveying system comprising at least a geodetic surveying appliance as claimed in claim 1 for finding the position of a target; and
    a known target mark with an external form which is designed such that the target is indicated with a high level of precision in space by the target mark.

14. A method for fine sighting of a target defining a surveying point with geodetic accuracy, which target is indicated with a high level of precision in space by a known target mark with an external form designed for this purpose, using a geodetic surveying appliance comprising:
    a targeting device, wherein the targeting device can swivel in motorized fashion relative to a base of the surveying appliance in order to change the orientation thereof and includes:
        an objective-lens unit which defines an optical target axis (OA); and
        a camera sensor for acquiring a camera image of the sighted target mark;
    an angle sensor for the high-precision capture of the orientation of the target axis; and
    electronic data processing unit configured for image processing, data storage and control of the orientation of the targeting device, wherein:
a set of different target marks, which each define a target defining a surveying point with a high level of precision, is known, for each of which a target mark pattern database in the electronic data processing unit stores corresponding target mark patterns,
whereby automatically or by the user of the surveying appliance the respective target mark used is selectable and the corresponding target mark pattern for automatic target fine sighting from the target mark pattern database is called up and
    the high-precision targeting i.e. fine sighting of the target indicated by the target mark is achieved by virtue of the following steps being effected after execution of a manual or automatic coarse target sighting whereby the coarse target sighting is executed without the fine targeting camera and in the course of the coarse target sighting the targeting device is oriented to the target mark at least with such accuracy that the target mark is in the field of vision of the camera sensor, in particular under the automatic control of the electronic data processing unit:
    taking a camera image of the target mark;
    matching a target mark pattern corresponding to the external form of the known target mark and embodied as a target mark template, and for which a main point is defined as indicating the target to, in particular made consistent with, the target mark in the taken camera image by means of image processing, wherein the target mark pattern in the camera image is made consistent with the target mark, such that it is aligned with the depiction of the target mark in the camera image;

determining a position of the main point of the target mark pattern in the camera image in the matched state of the target mark pattern is determined; and changing the orientation of the targeting device is changed in a motorized fashion on the basis of the determined position of the main point in the camera image such that the optical target axis is oriented with a high level of precision to the target.

15. A method according to claim 14, wherein the targeting device is a telescopic sight.

16. A non-transitory computer readable storage medium having instructions stored thereon which, when executed by a geodetic surveying appliance, causes the appliance to perform a method for fine sighting of a target defining a surveying point with geodetic accuracy, which target is indicated with a high level of precision in space by a known target mark with an external form designed for this, wherein:

the geodetic surveying appliance comprises: a targeting device, wherein the targeting device can swivel in motorized fashion relative to a base of the surveying appliance in order to change the orientation thereof and includes:
an objective-lens unit which defines an optical target axis (OA); and
a camera sensor for acquiring a camera image of the sighted target mark;
an angle sensor for the high-precision capture of the orientation of the target axis; and
an electronic data processing unit configured for image processing, data storage and control of the orientation of the targeting device, wherein:
a set of different target marks, which each define a target defining a surveying point with a high level of precision, is known, for each of which a target mark pattern database in the electronic data processing unit stores corresponding target mark patterns,
whereby automatically or by the user of the surveying appliance the respective target mark used is selectable and the corresponding target mark pattern for automatic target fine sighting from the target mark pattern database is called up and the high-precision targeting i.e. fine sighting of the target indicated by the target mark is effected after execution of a manual or automatic coarse target sighting whereby the coarse target sighting is executed without the fine targeting camera and in the course of the coarse target sighting the targeting device is oriented to the target mark at least with such accuracy that the target mark is in the field of vision of the camera sensor, the instructions, when executed by the appliance, causing the appliance, under the automatic control of the electronic data processing unit, to perform the method that includes:

taking a camera image of the target mark;

matching a target mark pattern, corresponding to the external form of the known target mark and embodied as a target mark template, and for which a main point is defined as indicating the target, to the target mark in the taken camera image by means of image processing, wherein the target mark pattern in the camera image is made consistent with the target mark by aligning it with the depiction of the target mark in the camera image;

determining a position of the main point of the target mark pattern in the camera image in the matched state of the target mark pattern; and changing the orientation of the targeting device in a motorized fashion on the basis of the determined position of the main point in the camera image such that the optical target axis is oriented with a high level of precision to the target.

17. The geodetic surveying appliance as claimed in claim 12, wherein a horizontal orientation and an inclination of the target mark is determined.

* * * * *